United States Patent [19]

Root

[11] 4,218,755
[45] Aug. 19, 1980

[54] WEATHER FORECASTING APPARATUS

[76] Inventor: Steven A. Root, 804 E. Hills Dr., Bountiful, Utah 84010

[21] Appl. No.: 916,152

[22] Filed: Jun. 19, 1978

[51] Int. Cl.² .......................... G06F 3/02; G06F 3/14; G01W 1/10
[52] U.S. Cl. .................................. 364/900; 364/420; 364/715; 73/170 R
[58] Field of Search ... 364/200 MS File, 900 MS File, 364/420, 439, 443, 449, 458, 550, 557, 558, 715; 73/170 R; 324/72

[56] References Cited

U.S. PATENT DOCUMENTS

| | | | |
|---|---|---|---|
| 1,920,048 | 7/1933 | Anareta | 73/170 R |
| 3,753,117 | 8/1973 | Downing et al. | 73/170 R |
| 3,859,635 | 1/1975 | Watson et al. | 364/200 |
| 3,924,111 | 12/1975 | Farris | 364/443 |
| 3,979,057 | 9/1976 | Katz et al. | 364/443 |
| 3,979,728 | 9/1976 | Reddaway | 364/200 |
| 4,023,408 | 5/1977 | Ryan et al. | 73/170 R |
| 4,087,857 | 5/1978 | Joyce et al. | 364/200 |
| 4,095,221 | 6/1978 | Slocum | 73/170 R |
| 4,114,442 | 9/1978 | Pratt | 364/557 |
| 4,133,509 | 1/1979 | Bliss | 244/188 |

*Primary Examiner*—Mark E. Nusbaum
*Attorney, Agent, or Firm*—Thorpe, North & Gold

[57] ABSTRACT

Weather forecasting apparatus for producing a visual indication of a weather forecast in response to supplied information, with such supplied information including current weather conditions, current wind speed and wind direction, geographical region information, and season of the year information. The apparatus includes a keyboard upon which such information may be entered, encoders for encoding the information, a display section for lighting one of a plurality of lamps to indicate forecasted weather, and read only memory elements having a plurality of memory locations for storing weather forecast data and for supplying the weather forecast data to the display section from memory locations specified by the coded data. Temperature and relative humidity detecting circuitry may also be included in the apparatus for providing a visual indication of the current temperature and current relative humidity.

9 Claims, 6 Drawing Figures

WEATHER FORECASTING APPARATUS

BACKGROUND OF THE INVENTION

This invention relates to apparatus for predicting future weather conditions in response to supplied information of current conditions.

Accurate and timely weather forecasting is of interest not only to persons whose livlihood and activities depend upon the weather such as farmers, builders, sponsors of outdoor events, etc., but also to the average person who may want to plan a recreational activity with some assurance of having the appropriate weather during the activity. Such interest is evidenced in the fact that nearly all television and radio news programs include information about current and projected weather. Such programs, however, are typically presented only periodically during the day and require access to a television set or radio in order to receive the information. Further, weather forecasts presented on radio or television may be hours old and thus inaccurate. Predicted weather information is also usually available by telephone but, again, access to the telephone is required before the information can be obtained.

For a variety of reasons, it would be desirable for persons to have instantaneous access to accurate weather forecast information without requiring the availability of a television set, radio or telephone. It would also be desirable that such weather forecast information be formulated and made available from input information consisting of readily observable current information such as wind direction and speed, season of the year, geographical location, and current status of the weather such as whether it is cloudy, partly cloudy, raining, snowing, etc. Since such parameters or at least estimates of such parameters can generally be accurately ascertained by human observation, weather forecasting using such parameters would be advantageous not only in situations where access to television, radio or telephone was not available, but also in situations where verification of publicly available forecasts was desired.

SUMMARY OF THE INVENTION

It is an object of the invention to provide compact, portable and easy to use weather forecasting apparatus on which a weather forecast can be displayed or otherwise made available to a user in response to supplied information regarding current conditions.

It is also an object of the invention to provide apparatus which is lightweight and which may be held in the hand for use by a person in determining weather forecasts.

It is a further object of the present invention to provide such apparatus in which current weather information, current wind speed and wind direction information, and season of the year information is supplied to the apparatus in response to which the apparatus supplies a forecast of the weather.

The above and other objects of the invention are realized in a specific illustrative embodiment which includes a housing dimensioned to be held in the hand of a person, keyboard structure disposed in the housing and having a plurality of manually operable keys upon which current weather information, current wind speed and wind direction information, and season of the year information may be entered, and an encoder for producing coded data in response to the operation of the keys, in which the coding of the coded data is determined by which keys are operated. Display structure is also carried by the housing to produce a visual display of weather forecast information in response to receipt of weather forecast data. Such weather forecast data is supplied by read only memory elements in response to receipt of coded data from the encoder. In this manner, forecast information is provided to a user in response to the user keying in information as to current conditions.

BRIEF DESCRIPTION OF THE DRAWINGS

The above and other objects, features and advantages of the present invention will become apparent from a consideration of the following detailed description presented in connection with the accompanying drawings in which.

DETAILED DESCRIPTION

Figure 1:
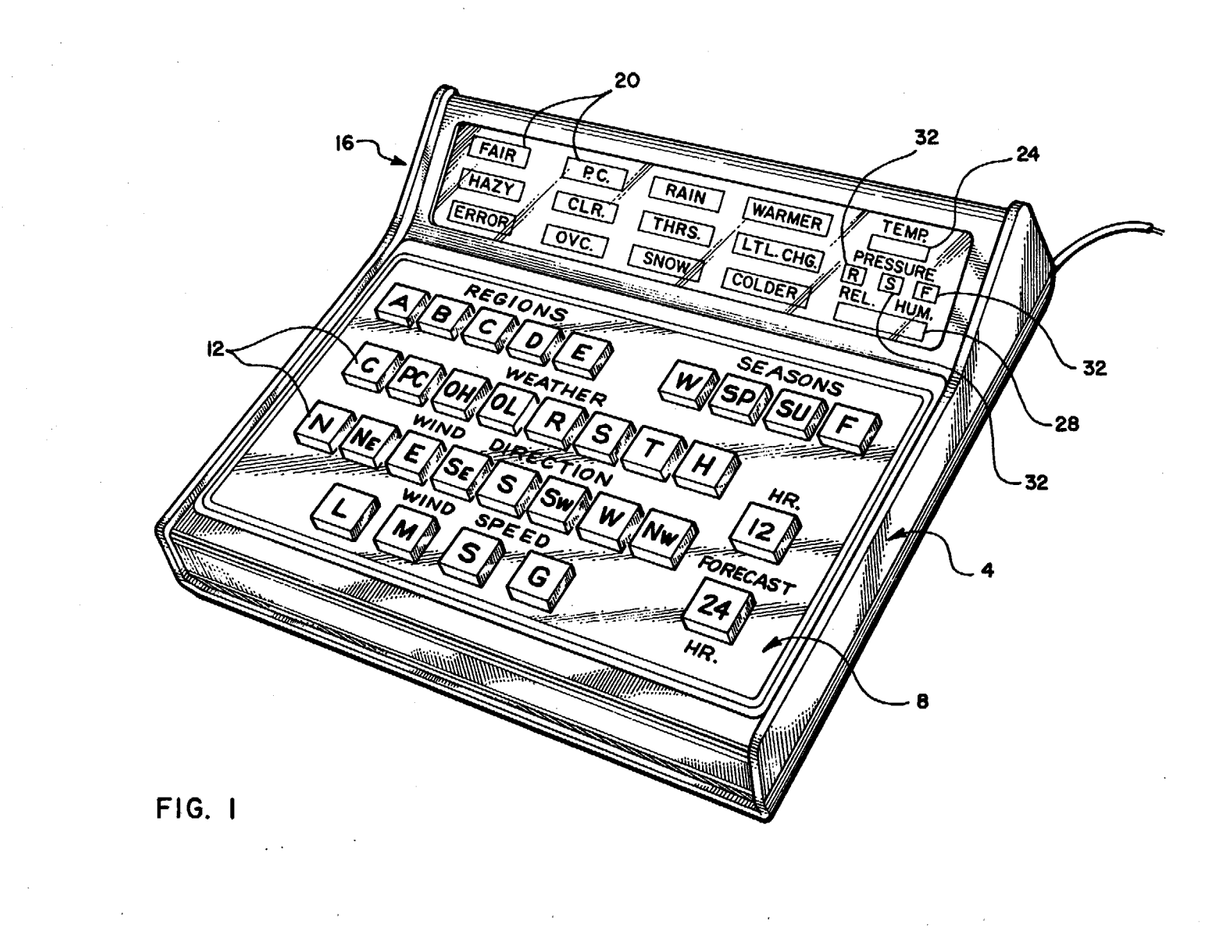
FIG. 1 is a perspective view of weather forecasting apparatus made in accordance with the principles of the present invention.

Referring to FIG. 1, there is shown a perspective view of weather forecasting apparatus which is suitable for being held in the hand of a user. The apparatus includes a housing 4 which, in turn, includes a keyboard 8 having a plurality of keys 12 which are used for keying certain information about current conditions which is to be used for forecasting future weather conditions. There are six groups of keys, each group being identified by the type of information which is supplied to the apparatus on the corresponding keys. These groups include one labeled "regions" upon which may be entered information identifying the geographical region in which the forecast is desired, one labeled "seasons" upon which may be entered information identifying the season of the year, one which is labeled "weather" upon which may be entered information identifying current weather conditions, one which is labeled "wind direction" upon which may be entered information identifying the current direction of the wind, one labeled "forecast" upon which may be entered information identifying whether a twelve hour or a twenty-four hour forecast is desired, and one which is labeled "wind speed" upon which may be entered information identifying the current wind speed.

Any number of "region" keys could be provided, each of which would represent a different geographical region of the country. (If the user were only interested in one geographical region, then of course no "region" keys would be needed.) Five such "region" keys are shown and could illustratively represent: A=majority of the East and Mid-Western States, B=Southern extensions of the Great Lakes area, C=the Mountain West and Great Basin, D=the Pacific Northwest, and E=the interior valleys and coastal areas of California. The different areas generally would represent different land mass topographies with the specific dividing lines between the different regions being determined beforehand.

There are four "seasons" keys representing the winter, spring, summer and fall seasons. Eight "weather" keys are shown to illustratively represent the possible current weather conditions of "clear", "partly cloudy", "overcast high", "overcast low", "rain", "snow", "thunderstorm", and "hazy".

There are also eight "wind direction" keys to include the directions of "north", "northeast", "east", "southeast", "south", "southwest", "west", and "northwest". Four "wind speed" keys are provided to represent "light", "moderate", "strong", and "gusty" wind speeds.

A visual display section 16 is formed in the housing 4 to provide a visual indication to the user of forecasted weather conditions. A plurality of light-emitting elements 20 are included in the display section 16, with each light-emitting element indicating a different type of weather condition. (Hereinafter, the light-emitting elements 20 will be referred to simply as "lamps" even though it should be understood that such elements may be lamps, light-emitting diodes or similar light-emitting devices. The possible forecasted weather conditions of the apparatus of FIG. 1 include "fair", "partly cloudy", "rain", "warmer", "hazy", "clear", "thunderstorm", "little change", "overcast", "snow", and "colder". There is also a lamp to indicate that an error has occurred such as if two of the "wind speed" keys are depressed when only one should have been depressed, etc. A display window 24 is provided for displaying the current temperature, and a display window 28 for displaying the current relative humidity. Three lamps 32 labeled "R", "S", and "F", are provided to indicate that the atmospheric pressure is respectively rising, steady, or falling.

In use, a person desiring to know the weather forecast simply depressed one key of each group with one of the "forecast" keys being the last to be depressed. Upon depressing the keys, the weather forecasting apparatus ascertains the appropriate weather forecast (in a manner to be described hereafter) and then activates at least one of the lamps 20 to identify the forecast. Only one of the lamps identified as "warmer", "little change", and "colder", will be lighted at one time. Of the lamps labeled "clear", "partly cloudy", and "overcast", any one or combination of two may be lighted except that both "clear" and "overcast" will never be lighted at the same time. Of the lamps labeled "snow", "rain", and "thunderstorm", any one, combination of two, or all three may be lighted. Finally, either the lamp labeled "fair" or "hazy" will be lighted or both. Of course, one of the lamps 32 will also be lighted to indicate the current condition of the atmospheric pressure.

Figure 2A:
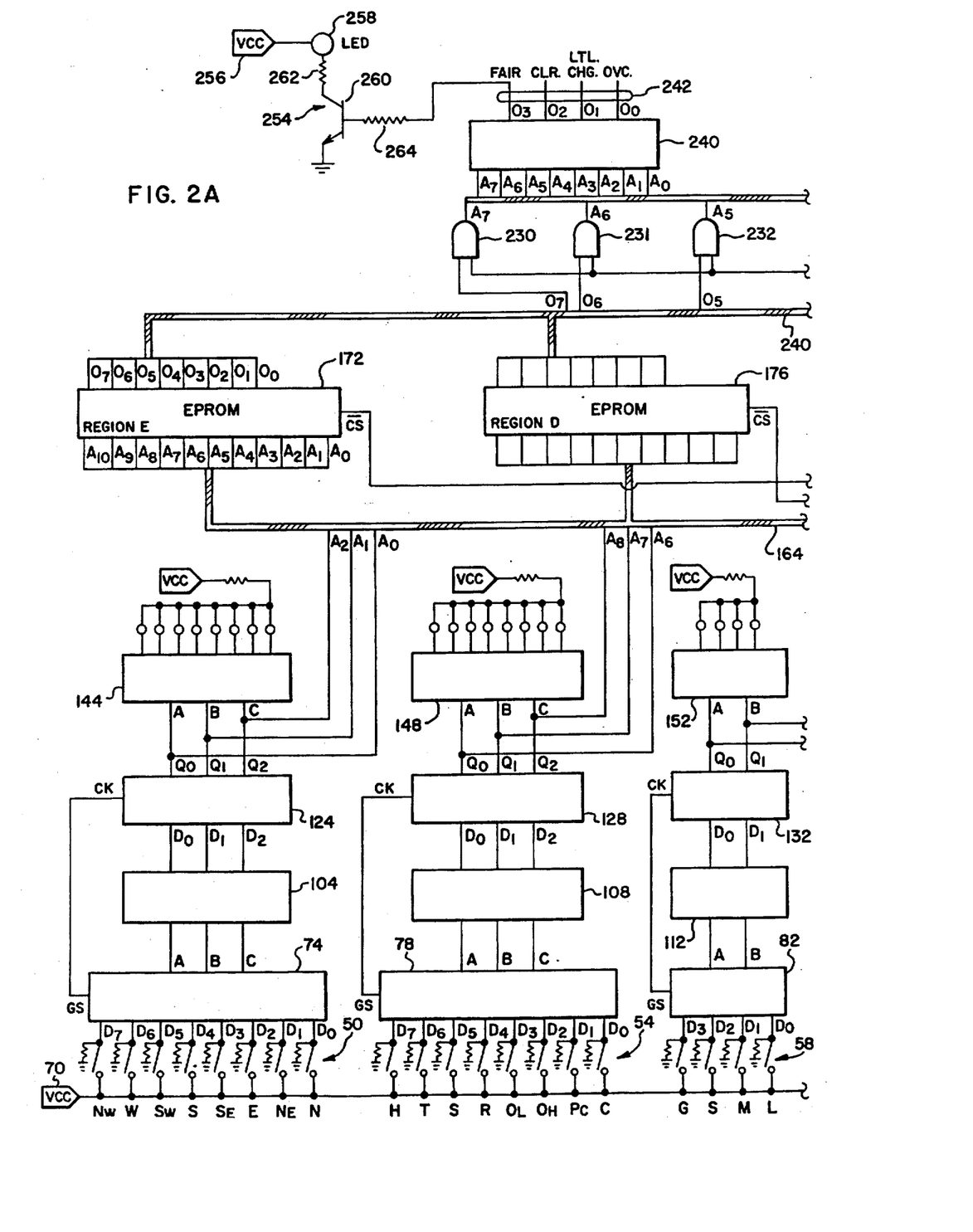
FIGS. 2A and 2B, with FIG. 2A positioned to the left of FIG. 2B, are schematic drawings of exemplary circuitry of the apparatus of FIG. 1.
Figure 2B:
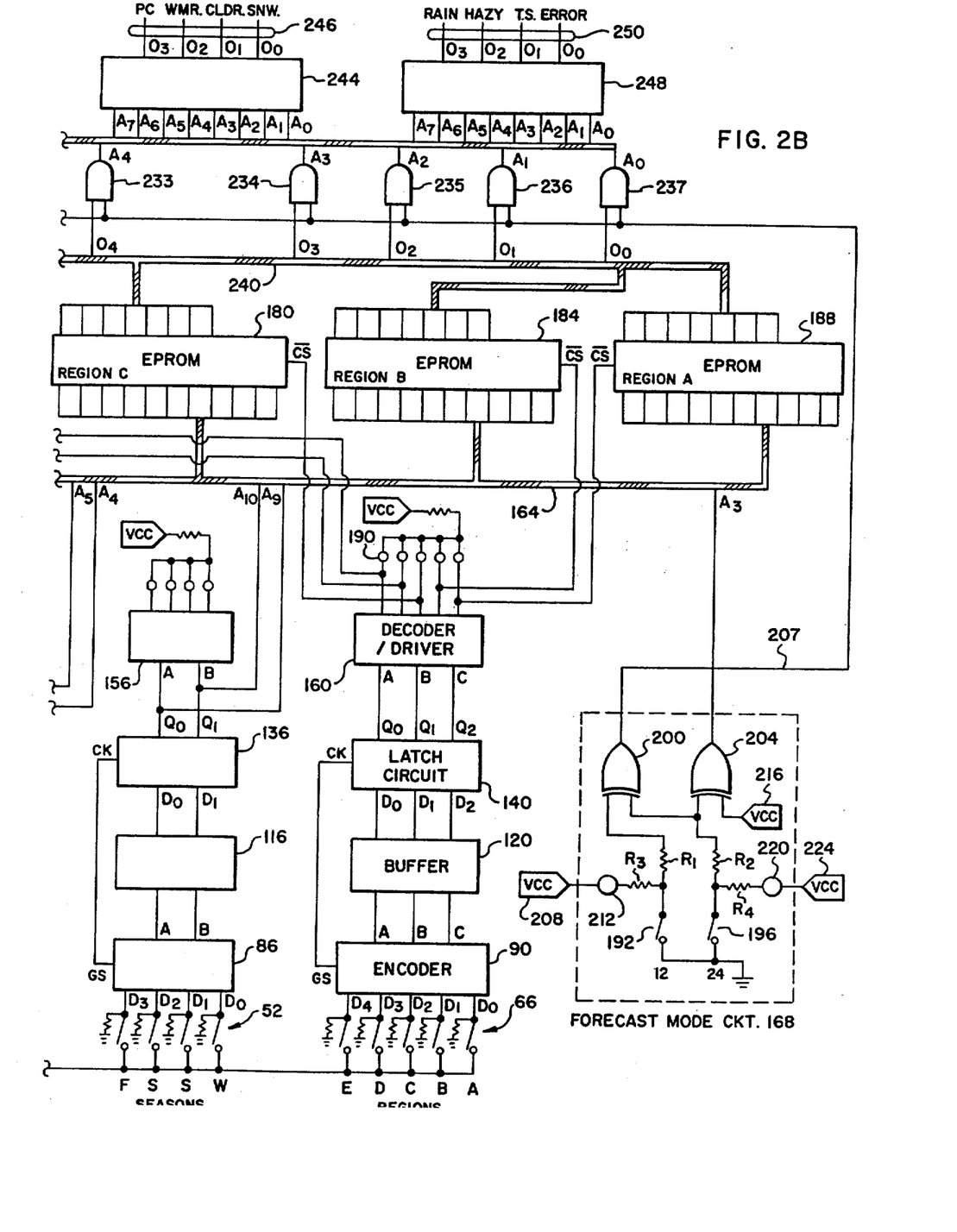

FIG. 2 is a schematic diagram of exemplary circuitry suitable for use in the apparatus of FIG. 1. The circuitry includes a plurality of groups of switches corresponding to the groups of keys shown in the apparatus of FIG. 1. That is, switches 50 correspond to the keys labeled "wind direction" of FIG. 1, switches 54 correspond to the keys labeled "weather", switches 58 correspond to the keys labeled "wind speed", switches 62 correspond to keys labeled "seasons", and switches 66 correspond to the keys labeled "regions" of FIG. 1. Each of these switches include a movable element coupled by a resistor to ground potential, and a stationary terminal coupled to a voltage source 70. When a switch is open (meaning that the corresponding key is undepressed), ground potential is supplied via the switch to a corresponding one of the encoders 74 through 90. When a switch is closed (meaning that the corresponding key is depressed), voltage from the voltage source 70 is supplied to the corresponding one of the encoders 74 through 90.

The encoders 74 through 90 function to produce a binary output each time a switch in the corresponding group is closed. Encoders 74, 78 and 90 produce three-bit binary outputs for each corresponding switch closure and encoders 82 and 86 produce two-bit binary outputs in response to operation of the corresponding switches. Exemplary encoders which could be utilized in the present invention are produced by Motorola Corporation and have the circuit designation 14532B. Of course a variety of other encoders could also be utilized.

The outputs of the encoders are applied to corresponding buffers 104 through 120 which temporarily store the outputs while also applying the outputs to corresponding latch circuits 124 through 140. The latch circuits, in response to a clock pulse on a lead labeled "CK", stores the corresponding outputs from the buffers and in turn applies these outputs to a corresponding one of decoder/drivers 144 through 160. The clock pulses applied to the leads labeled "CK" are produced by the encoders 74 through 90 each time a switch connected to the encoders is closed. The buffers 104 through 120 could illustratively be the buffer circuits produced by Motorola Corporation and identified as No. 14050B. The latch circuits could also be circuits produced by Motorola and identified as No. 14042B.

The outputs from the latch circuits 124 through 136 are also applied to a data bus 164 which carries eleven bits of data, three from latch circuit 124, three from latch circuit 128, two from latch circuit 132, two from latch circuit 136 and one from a "forecast mode" circuit 168, to be discussed hereafter. The data bus 164 supplies the bits from the latch circuits and the forecast mode circuit 168 to each of five erasable programmable read only memories (EPROM's) 172 through 188. These will be discussed later.

Each decoder/driver 144 through 160 decodes the data inputs from a corresponding latch circuit and then applies a signal to a particular one of a group of light-emitting diodes to which the decoder/driver is connected. Each group of light-emitting diodes is coupled by way of a resistor to a voltage source. The particular light-emitting diode to which the signal is applied is determined by the inputs received from the corresponding latch circuit. That is, the outputs from the latch circuits are decoded to determine to which light-emitting diodes the signals should be applied. The signals applied to the light-emitting diodes are ground-level signals to enable current to flow from the corresponding voltage source through the diodes to cause the diodes to emit visible light and thereby identify which of the switches were closed, i.e., which of the keys 12 of FIG. 1 were depressed. The light-emitting diodes simply serve as a check to the user of the apparatus to verify which of the keys were operated and could be positioned either adacent the corresponding keys, or within the corresponding keys with the keys being made of clear material to allow the light from the diodes to shine through. The decoder/drivers could illustratively be the circuit identified as No. 74LS139, produced by Texas Instruments, Inc.

The signal produced by decoder/driver 160 is applied not only to a corresponding light-emitting diode but also to a certain one of the EPROM's 172 through 188 to enable that EPROM. For example, if switch $D_4$ of the group of switches 66 coupled to encoder 90 were closed, then the encoder 90 would produce an output which would be supplied via the buffer 120 to the latch circuit 140 and then to the decoder/driver 160. The decoder/driver 160, in turn, would supply a signal to light-emitting diode 190 to cause the diode to emit light, and also to EPROM 172 to enable the EPROM. Thus, closing a particular one of the switches 66 causes enablement of a different one of the EPROM's 172 through 188.

The forecast mode circuit 168 includes a pair of switches 192 and 196 representing respectively a twelve-hour forecast and a twenty-four-hour forecast. Switch 192 is coupled by way of a resistor $R_1$ to an EXCLUSIVE-OR gate 200, whereas switch 196 is coupled by way of a resistor $R_2$ to the EXCLUSIVE-OR gate 200 and also to an EXCLUSIVE-OR gate 204. When switch 192 is closed, resulting from depression of the key labeled "12 Hr." in FIG. 1, one of the inputs to the EXCLUSIVE-OR gate 200 is made low causing the gate to apply a high signal to output lead 207. Closing of the switch 192 also couples a resistor $R_3$ to ground potential enabling current to flow from a voltage source 208 via a light-emitting diode 212 to ground and causing the light-emitting diode to emit light. When the switch 196 is closed, a low signal is again supplied to the EXCLUSIVE-OR gate 200 causing it to apply a high signal again to output lead 207. Thus, EXCLUSIVE-OR gate 200 produces a high signal in response to closure of either switch 192 or 196. When switch 196 is closed, a low signal is also supplied to the EXCLUSIVE-OR gate 204 causing it to supply a high signal to the data bus 164 previously discussed. The EXCLUSIVE-OR gate 204 has a second input which is continuously coupled to a voltage source 216 so it is constantly receiving a high signal therefrom. The switch 196 is also coupled via a resistor $R_4$ to a light-emitting diode 220 which, in turn, is coupled to a voltage source 224. Closure of switch 196 couples the ground potential to the resistor $R_4$ so that current can flow from the voltage source 224 through the light-emitting diode 220 and the resistor $R_4$ to ground, causing the light-emitting diode to emit light. The light-emitting diodes 212 and 220 are positioned either adjacent to or within the keys labeled "12 Hr." and "24 Hr." respectively of FIG. 1 as discussed for the other light-emitting diodes and keys.

In summary, when the switch 192 is closed, indicating that the user desires a twelve-hour forecast, light-emitting diode 212 lights, EXCLUSIVE-OR gate 200 applies a high signal to lead 207, and EXCLUSIVE-OR gate 204 applies a low signal to the bus 164. When the switch 196 is closed, light-emitting diode 220 emits light, EXCLUSIVE-OR gate 200 again applies a high signal to lead 207, and EXCLUSIVE-OR gate 204 applies a high signal to the data bus.

The high signal applied to lead 207 is applied to one of the inputs of each of a plurality of AND gates 230 through 237. The other inputs of each of the AND gate 230 through 237 are coupled to a data bus 240 on which outputs from the EPROM's 172 through 188 is supplied. Each of the EPROM's includes eight output leads and each of these output leads are coupled to a different one of the AND gates 230 through 237.

Backtracking briefly, when a particular one of the EPROM's 172 through 188 is enabled by an output of the decoder/driver 160, the EPROM responds to the data on data bus 164 by retrieving certain weather forecast information which is stored in the EPROM's and supplies this weather forecast information to its output lines. For example, if the keyed inputs were region "A" (majority of east and midwestern states, "W" (winter) season, "C" (clear) weather, "N" (north) wind direction, "L" (light) wind speed, and "12 Hr." forecast, the retrieved information would indicate a forecast of "fair", "clear" and "ltl. chg." (little change). As will be discussed momentarily, such retrieved information would cause the lighting of the lamps labeled "fair", "clear" and "ltl. chg." in FIG. 1.

As another example, if the keyed inputs were region "B" (southern extensions of the Great Lakes), "Sp" (spring) season, "OL" (overcast low) weather, "S" (south) wind direction, "S" (strong) wind speed, and "24 Hr." forecast, the retrieved information would indicate a forecast of "ovc" (overcast), "snow", and "colder". For these same inputs except with a "12 Hr." forecast rather than a "24 Hr." forecast, the retrieved information would indicate a forecast of "ovc", "rain", "snow", and "warmer".

The forecast information stored in the EPROM's is determined simply by making observations of what weather generally occurs in 12 hours and 24 hours in the different regions and during the different seasons for every combination of inputs. Of course, a determination of what "typically" occurs would have to be made since it is possible that quite different weather conditions may result 12 or 24 hours later even though current input conditions are the same. The examples given above are illustrative of the type of weather forecasts which have been determined to generally prevail for the indicated inputs.

An exemplary unit which could be utilized as the EPROM's of the present invention is the Intel 2716 EPROM.

The output from the enabled EPROM is applied to a data bus 240 and to the AND gates 230 through 237. The output signal on lead 207 from the forecast mode circuit 168 enables the AND gates to pass the data from the data bus 240 to three decoder/display drivers 240, 244 and 248. The decoder/display drivers respond to the data input by activating, i.e., applying a signal to, selected output leads 242, 246 and 248. Activation of one of these leads results in the activation of a corresponding one of the "lamps" 20 described in conjunction with FIG. 1. Thus, the output leads 242 of the decoder/display driver 240 are utilized to light the "lamps" indicating a "fair", "clear", "little change", or "overcast" condition. The output leads of the other decoder/display drivers 244 and 248 similarly activate "lamps" indicated by the labels adjacent to the leads. One or more of the output leads from the decoder/display drivers may be activated at a time.

Exemplary devices for use as decoder/display drivers are programmable read only memories such as the Intel 3621 PROM. With such PROM's, the received data identifies a memory location containing data which identifies which output lead or output leads are to be activated. Other type decoder/display drivers could also be provided.

An exemplary circuit for lighting the "lamps" in response to current supplied to the output leads of the decoder/display drivers 240 through 248 is identified by numeral 254. This circuit includes a voltage source 256, a light-emitting diode 258, a transistor 260 whose collector electrode is coupled by way of a resistor 262 to the light-emitting diode 258, and a resistor 264 coupling the base of the transistor 260 to the output lead labeled "fair" of the decoder/display driver 240. The emitter electrode of the transistor 260 is coupled to ground. When current is supplied to the lead labeled "fair", the transistor 60 is caused to turn on and become conducting so that current is allowed to flow from the voltage source 256 through the light-emitting diode 258 and the resistor 262, and through the transistor 260. The light-emitting diode 258 corresponding to the lamp labeled "fair" in FIG. 1 is thus lighted. The other leads of the groups of leads 242, 246 and 248 are similarly coupled to a circuit such as circuit 254.

In the manner described, information as to current conditions is utilized to enable generation of forecasted weather conditions. The current information is keyed on a keyboard and used to identify memory locations in erasable programmable read only memories, from which locations forecast data is retrieved. Such forecast data is then applied to decoder/display drivers to light selected "lamps" to identify the desired forecast.

Figures 3, 4:
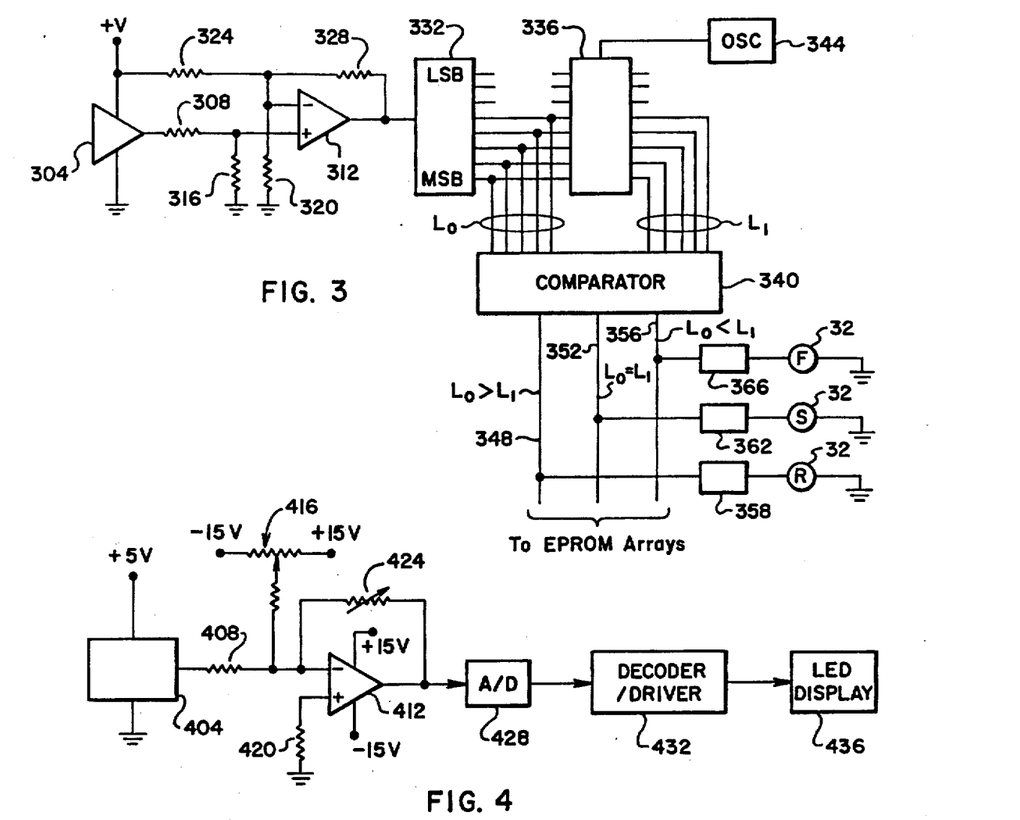
FIG. 3 is exemplary atmospheric pressure detecting circuitry for use in the present invention.
FIG. 4 is exemplary relative humidity detecting circuitry for use in the present invention.

FIG. 3 shows exemplary circuitry for detecting atmospheric pressure and for lighting one of three lamps or light-emitting diodes 32 to indicate that the atmospheric pressure is either falling (indicated by the letter "F"), steady (indicated by the letter "S"), or rising (indicated by the letter "R"). The output from the circuit of FIG. 3 is also utilized to enable a different array of EPROM's to provide a forecast depending upon the atmospheric pressure. That is, two more EPROM arrays, similar to the array of EPROM's 172 through 188 of FIG. 2 would be provided, with each array containing different forecast data to reflect a forecast for each of the three atmospheric pressure conditions of "falling", "steady", and "rising". Then, if the output of the FIG. 3 circuit indicated that the atmospheric pressure were falling, a certain one of the arrays would be enabled to provide its output to the decoder/display drivers 240 through 248 of FIG. 2, whereas if the output of the FIG. 3 circuit indicated that the atmospheric pressure were "steady", then a different EPROM array would be enabled to provide its output to the decoder/display drivers, etc.

The circuit of FIG. 3 includes a pressure transducer 304 which produces an output voltage signal whose magnitude is proportional to the atmospheric pressure to which the transducer is exposed. The transducer might illustratively be an integrated circuit identified as Lx 1701A, produced by National Semiconductor, Inc. The output voltage signal from the transducer 304 is supplied via a resistor 308 to the positive input terminal of a summing amplifier 312. Another resistor 316 is coupled between the positive input terminal of the amplifier 312 and ground potential to form a voltage divider with the resistor 308. The negative input terminal of the summing amplifier 312 is coupled via a resistor 320 to ground and also to the junction between a resistor 324 and another resistor 328. The resistor 328 is also coupled to the output of the summing amplifier 312. The resistor 324 is coupled to a positive voltage source as indicated. The values of the resistors 320 and 324 are selected to provide a zero voltage output from the summing amplifier 312 at a certain minimum atmospheric pressure (the lowest pressure which might be expected) to remove an offset factor which is typically present in pressure transducers such as transducer 304. The output of the summing amplifier 312 is a voltage signal which is proportional to the input voltage on the positive input terminal and this output is supplied to an analog-to-digital convertor 332.

The voltage input to the analog-to-digital convertor 332 is converted to a digital output and supplied to a latch circuit 336 and also to a comparator 340. The latch circuit 336 stores the digital output from the analog-to-digital convertor 332 each time it is pulsed by an oscillator 344, with the oscillator being settable to produce a pulse at selectable intervals such as 1, 2, 3, 4, etc., hours. That is, the latch circuit 336 maintains a previously stored output of the analog-to-digital convertor 332 until pulsed to store the then present output. The contents of the latch circuit 336 are supplied to the comparator and these contents (labeled "$L_1$") are compared with the output of the analog-to-digital convertor 332 (which output is labeled "$L_0$") by the comparator 340. In effect, the comparator 340 compares the current atmospheric pressure level, represented by $L_0$, with a pressure level which was present some time earlier, represented by $L_1$. The comparator then supplies an output signal on one of three leads 348, 352 and 356. If the atmospheric pressure is rising, indicated by $L_0$ being greater than $L_1$, then a signal is applied to lead 348 and to a lamp driver 358 to cause the lighting of the light-emitting diode labeled "R". The signal on lead 348 is also applied to a corresponding EPROM array to enable such array as before discussed. If the atmospheric pressure is "steady" or "falling" then the signal will be applied respectively to lead 352 or 356 for causing the light-emitting diode labeled "S" or labeled "F" to emit light. The light-emitting diodes labeled "F", "S" and "R" correspond to lamps labeled "F", "S" and "R" respectively in FIG. 1. Signals on either lead 352 or 356 would also cause different corresponding EPROM arrays to supply outputs to decoder/display drivers 240 through 248 of FIG. 2, as earlier discussed. In this manner, the atmospheric pressure provides an additional parameter for producing a forecast of the weather; also a direct visual indication to the user is provided as to whether the pressure is rising, steady or falling.

FIG. 4 shows an exemplary circuit for producing an indication of the current relative humidity. Such indication is not utilized to produce the forecast but simply provides further information to the user as to the current weather condition.

The circuit of FIG. 4 includes a transducer 404 for detecting the current relative humidity to which the transducer is exposed and for producing an output voltage which is proportional to the humidity. The transducer 404 could illustratively be the transducer identified as IRC-2000, produced by Thunder Scientific, Inc. The output of the transducer 204 is supplied via a resistor 408 to the negative input terminal of a summing amplifier 412. A potentiometer 416 is also coupled to the negative input terminal of the amplifier 412 to provide an offset adjustment so that the voltage input to the negative input terminal will be at zero level when the relative humidity is at some predetermined minimum value such as, for example, 5%. The positive input terminal of the summing amplifier 412 is coupled via resistor 420 to ground potential. A variable resistor 424 is coupled between the output lead of the summing amplifier 412 and the negative input terminal thereof to provide for adjusting the gain of the amplifier.

The output voltage signal produced by the summing amplifier 412 is proportional to the input on its negative input terminal and this output is supplied to an analog-to-digital convertor 428. The analog-to-digital convertor converts the voltage signal to a digital value and supplies it to a decoder/driver unit 432 which, in turn, applies a signal to a light-emitting diode (LED) display 436 causing the display to produce a visual digital value representing the present relative humidity. The display 436 corresponds to the display window 28 of FIG. 1. The analog-to-digital convertor 428, decoder/driver 432 and LED display 436 are all conventional units.

Figure 5:
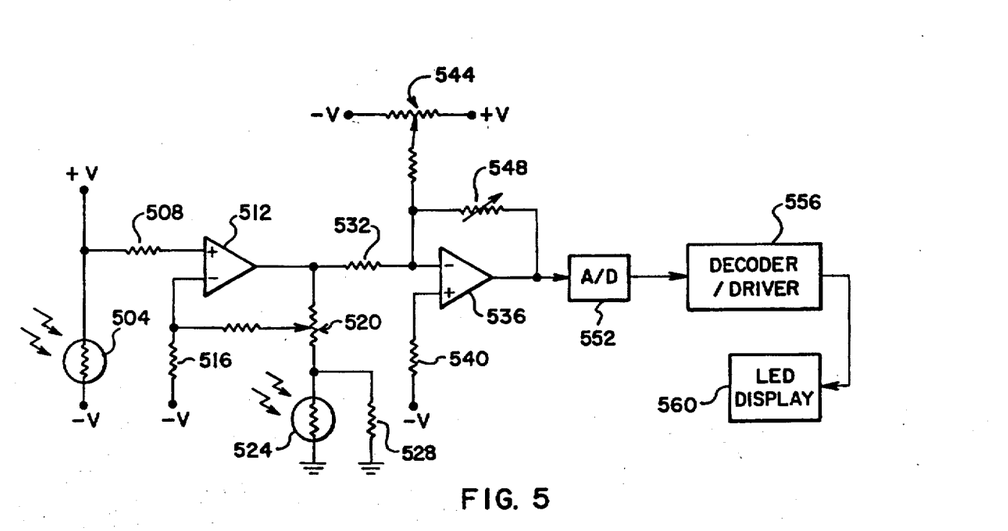
FIG. 5 is exemplary temperature determining circuitry for use in the present invention.

FIG. 5 shows an exemplary circuit for producing a visual indication of the current temperature, simply for information for the user and not for use in producing the weather forecast. The circuit includes a thermistor 504 whose resistance decreases with increase in temperature and vice versa. One side of the thermistor is coupled to a negative voltage source and the other side is coupled to a positive voltage source and also via a resistor 508 to the positive input terminal of a summing amplifier 512. The negative input of the summing amplifier 512 is coupled via a resistor 516 to a negative voltage source and also to a potentiometer 520. The potentiometer is also coupled to the output of the summing amplifier 512 and enables the user to adjust the gain of the amplifier. The potentiometer 520 is also coupled to a second thermistor 524 and a resistor 528 coupled in parallel to ground potential. The thermistor 524 is provided to compensate for nonlinearities in the characteristics of the first thermistor, i.e., to subtract out or add in factors which both thermistors would be subjected to in order to eliminate nonlinearities.

The output voltage of the summing amplifier 512 is inversely proportional to the current temperature and so to invert this output it is supplied via a resistor 532 to the negative input terminal of another summing amplifier 536. The positive input terminal of the amplifier 536 is coupled by way of a resistor 540 to a negative voltage source. The negative input terminal of the summing amplifier 536 is also coupled to a potentiometer 544 to provide an offset adjustment, i.e., to provide a zero voltage input to the negative input terminal of the amplifier 536 when the temperature is at some predetermined minimum level. A variable resistor 548 is coupled between the negative input terminal of the summing amplifier 536 and the output thereof to provide for gain adjustment.

The output of the summing amplifier 536 is inversely proportional to the input voltage on the negative input terminal and is proportional to the current temperature; this output is supplied to an analog-to-digital convertor 552 which converts the voltage signal to a digital value which is supplied to a decoder/driver unit 556. The decoder/driver unit then supplies a signal to an LED display unit 560 to cause the unit to provide a visual digital value of the current temperature. The display unit 560 corresponds to the display window 24 of FIG. 1. Again, the analog-to-digital convertor 552, decoder/driver 556 and LED display unit 560 are all conventional elements. Thus, the user is supplied with a reading both of the relative humidity and the temperature simply for his own use, but not for making a forecast.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. Apparatus for producing weather forecast information in response to supplied information, said apparatus comprising
   a housing dimensioned so that it can be held in the hand,
   keyboard means disposed in said housing and including
      a first plurality of manually operable keys upon which current weather information may be entered by operation of keys appropriately designated and representing different types of weather,
      a second plurality of manually operable keys upon which current wind speed information may be entered by operation of keys appropriately designated and representing different wind speeds,
      a third plurality of manually operable keys upon which current wind direction information may be entered by operation of keys appropriately designated and representing different wind directions,
      a fourth plurality of manually operable keys upon which current season of the year information may be entered by operation of keys appropriately designated and representing diffferent seasons of the year,
   first address means responsive to the operation of said first plurality of keys for producing a first partial address,
   second address means responsive to the operation of said second plurality of keys for producing a second partial address,
   third address means responsive to the operation of said third plurality of keys for producing a third partial address,
   fourth address means responsive to the operation of said fourth plurality of keys for producing a fourth partial address,
   display means carried by the housing for producing a visual display of weather forecast information in response to receipt of weather forecast data,
   read only memory means having a plurality of memory locations for storing weather forecast data and for supplying weather forecast data to said display means from memory locations each specified by an input address, and
   means for combining the partial addresses to produce an input address for application to said read only memory to identify a location in the memory from which weather forecast data is to be read.

2. Apparatus as in claim 1 wherein said keyboard means further includes a multiplicity of region keys, each of which is appropriately designated and represents a different geographical region, and wherein said read only memory means includes a multiplicity of read only memories, each of which stores weather forecast data for a different one of said geographical regions and each of which is enabled to supply weather forecast data when a corresponding one of said region keys is operated.

3. Apparatus as in claim 2
   wherein said keyboard means further includes a fifth plurality of manually operable forecast mode keys, each of which represents a different future time period over which the desired weather forecast information is to apply, said apparatus further including fifth address means responsive to the operation of said fifth plurality of keys for producing a fifth partial address for application to said combining means.

4. Apparatus as in claim 1 wherein said display means comprises a plurality of light-emitting devices, each representing a different weather forecast condition, for emitting light in response to activating signals, and decoder means for selectively applying activating signals to said light-emitting devices in response to receipt of said weather forecast data.

5. Apparatus as in claim 1 further comprising second and third read only memory means, each having a plurality of memory locations for storing second and third weather forecast data respectively, and, when enabled, for supplying such data to said display means from memory locations specified by input addresses, wherein said first read only memory means is adapted to supply weather forecast data to said display means when enabled, means disposed in said housing for detecting atmospheric pressure and for periodically storing an indication of the detected pressure, means coupled to said detecting means for producing first, second and third signals indicating that the atmospheric pressure is respectively steady, rising or falling, means for applying said first signal to enable said first read only memory means, means for applying said second signal to enable said second read only memory means, and means for applying said third signal to enable said third read only memory means.

6. Apparatus as in claim 5 further comprising first display means responsive to said first signal for producing a visual indication that the atmospheric pressure is steady, second display means responsive to said second signal for producing a visual indication that the atmospheric pressure is rising, and third display means responsive to said third signal for producing a visual indication that the atmospheric pressure is falling.

7. Apparatus as in claim 1 further comprising means for producing a temperature signal whose value is proportional to current temperature, and display means responsive to said temperature signal for producing a visual indication of the current temperature represented by the value of the temperature signal.

8. Apparatus as in claim 1 further comprising means for producing a humidity signal whose value is proportional to current relative humidity, and display means responsive to said humidity signal for producing a visual indication of the current relative humidity represented by the value of the humidity signal.

9. A method for producing weather forecast information comprising storing weather forecast data in a read only memory, providing a keyboard means having a first, second, third and fourth plurality of keys, operating a first plurality of keys appropriately designated and representing different types of weather to thereby specify current weather information, operating a second plurality of keys appropriately designated and representing different wind speeds to thereby specify the current wind speed, operating a third plurality of keys appropriately designated and representing different wind direction information to thereby specify the current wind direction, operating a fourth plurality of keys appropriately designated and representing different seasons of the year to thereby specify the current season of the year, producing a first partial address in response to the operation of said first plurality of keys, producing a second partial address in response to operation of said second plurality of keys, producing a third partial address in response to operation of said third plurality of keys, producing a fourth partial address in response to operation of said fourth plurality of keys, combining said first, second, third and fourth partial addresses to produce an input address which indentifies a location in the read only memory, applying the input address to the read only memory to read therefrom the weather forecast data stored in the location identified by the input address, and producing a visual display of weather forecast information in response to the reading of the weather forecast data.

* * * * *